US011516587B2

(12) United States Patent
Landick

(10) Patent No.: US 11,516,587 B2
(45) Date of Patent: Nov. 29, 2022

(54) PANEL AUDIO LOUDSPEAKER ELECTROMAGNETIC ACTUATOR

(71) Applicant: GOOGLE LLC, Mountain View, CA (US)

(72) Inventor: Graham Robert Landick, Coveney (GB)

(73) Assignee: GOOGLE LLC, Mountain View, CA (US)

( * ) Notice: Subject to any disclaimer, the term of this patent is extended or adjusted under 35 U.S.C. 154(b) by 65 days.

(21) Appl. No.: 17/077,642

(22) Filed: Oct. 22, 2020

(65) Prior Publication Data

US 2021/0127210 A1     Apr. 29, 2021

Related U.S. Application Data

(63) Continuation of application No. 15/972,065, filed on May 4, 2018, now Pat. No. 10,848,874.

(Continued)

(51) Int. Cl.
*H04R 9/02*     (2006.01)
*H04R 9/06*     (2006.01)
(Continued)

(52) U.S. Cl.
CPC ............. *H04R 9/025* (2013.01); *G06F 1/163* (2013.01); *G06F 1/1626* (2013.01);
(Continued)

(58) Field of Classification Search
CPC .......... H04R 9/025; H04R 7/045; H04R 9/06; H04R 2400/03; H04R 2499/11; H04R 2499/15; H04R 2440/05; H04R 9/022; H04R 9/066; H04R 9/046; H04R 7/04; H04R 1/028; H04R 7/26; H04R 17/00;
(Continued)

(56) References Cited

U.S. PATENT DOCUMENTS 8,494,208 B2 *   7/2013   Fordham ................ H04R 9/066
                                                 381/396
9,515,541 B2 * 12/2016   Tang ...................... H02K 33/18
(Continued)

FOREIGN PATENT DOCUMENTS

CN     101175341 A      5/2008
CN     101297590 A     10/2008
(Continued)

OTHER PUBLICATIONS

English Translation of Taiwanese Office Action dated Jul. 27, 2021 for TW Application No. 108105399, 5 pages.
(Continued)

*Primary Examiner* — Angelica M McKinney

(57) ABSTRACT

An electromagnetic actuator includes an inner magnet arranged relative to an axis, an outer magnet arranged a radial distance from the axis, an inner radial wall of the outer magnet facing an outer radial wall of the inner magnet, the inner and outer radial walls being separated by an air gap, a voice coil arranged in the air gap separating the inner and outer magnets, and an actuator coupling plate attached to the voice coil. During operation of the device electrical activation of the voice coil causes axial motion of the actuator coupling plate.

15 Claims, 11 Drawing Sheets

Related U.S. Application Data

(60) Provisional application No. 62/654,173, filed on Apr. 6, 2018, provisional application No. 62/633,033, filed on Feb. 20, 2018.

(51) Int. Cl.
  *G06F 1/16* (2006.01)
  *H04R 7/04* (2006.01)
  *G06F 3/01* (2006.01)

(52) U.S. Cl.
  CPC ............ *G06F 1/1688* (2013.01); *G06F 3/016* (2013.01); *H04R 7/045* (2013.01); *H04R 9/06* (2013.01); *H04R 2400/03* (2013.01); *H04R 2499/11* (2013.01); *H04R 2499/15* (2013.01)

(58) Field of Classification Search
  CPC ...... H04R 1/26; H04R 5/02; H04R 2307/023; H04R 9/043; H04R 2307/027; H04R 2307/021; H04R 1/025; H04R 2400/11; H04R 2499/13; H04R 2440/07; G06F 1/1626; G06F 1/163; G06F 1/1688; G06F 3/016; H01F 7/064; H02K 33/00
  See application file for complete search history.

(56) References Cited

U.S. PATENT DOCUMENTS

| | | | | |
|---|---|---|---|---|
| 9,949,390 | B1* | 4/2018 | Doll | H04M 1/23 |
| 10,841,704 | B2* | 11/2020 | Landick | G06F 1/1688 |
| 10,848,874 | B2* | 11/2020 | Landick | H04R 7/045 |
| 2001/0026625 | A1 | 10/2001 | Azima et al. | |
| 2006/0110001 | A1 | 5/2006 | Saint Vincent et al. | |
| 2006/0115107 | A1 | 6/2006 | Vincent et al. | |
| 2009/0184589 | A1* | 7/2009 | Yamagishi | H04R 9/066 310/12.32 |
| 2015/0373458 | A1* | 12/2015 | Newlove | H04R 9/066 381/400 |
| 2017/0287990 | A1 | 10/2017 | Choi et al. | |

FOREIGN PATENT DOCUMENTS

| | | |
|---|---|---|
| CN | 101959095 A | 1/2011 |
| CN | 103503480 A | 1/2014 |
| CN | 205510381 U | 8/2016 |
| CN | 107454512 A | 12/2017 |
| CN | 107454519 A | 12/2017 |
| TW | 201803363 A | 1/2018 |
| WO | 2011125804 A1 | 10/2011 |
| WO | 2012129247 A2 | 9/2012 |

OTHER PUBLICATIONS

Taiwanese Office Action dated Nov. 25, 2020 for TW Application No. 108105399, 4 pages.
English Translation of Chinese Office Action dated May 27, 2021 for CN Application No. 201980013497.1, 21 pages.
English Translation of Chinese Office Action dated Apr. 1, 2021 for CN Application No. 201980023313.X, 19 pages.
English Translation of Chinese Office Action dated Oct. 15, 2021 for CN Application No. 201980023313.X, 19 pages.
Extended European Search Report and Opinion dated Dec. 13, 2021 for EP Application No. 21191328.0, 41 pages.
English Translation of Chinese Office Action dated Dec. 3, 2021 for CN Application No. 201980013497.1, 6 pages.
English Translation of Taiwanese Office Action dated Nov. 24, 2021 for TW Application No. 108105399, 3 pages.
English Translation of Taiwanese Office Action dated Aug. 9, 2022 for TW Application No. 110113762, 6 pages.
European Office Action dated Sep. 13, 2022 for EP Application No. 19 708 611.9, 6 pages.
English Translation of Chinese Office Action dated Sep. 19, 2022 for CN Application No. 201980013497.1, 19 pages.

\* cited by examiner

PANEL AUDIO LOUDSPEAKER ELECTROMAGNETIC ACTUATOR

CROSS-REFERENCE TO RELATED APPLICATIONS

This application is a continuation of U.S. patent application Ser. No. 15/972,065, entitled "PANEL AUDIO LOUDSPEAKER ELECTROMAGNETIC ACTUATOR," filed on May 4, 2018, which claims priority to Provisional Application No. 62/633,033, entitled "PANEL AUDIO LOUDSPEAKER ELECTROMAGNETIC ACTUATOR," filed on Feb. 20, 2018, and to Provisional Application No. 62/654,173, entitled "DISTRIBUTED MODE LOUDSPEAKER ELECTROMAGNETIC ACTUATOR WITH AXIALLY & RADIALLY MAGNETIZED CIRCUIT," filed on Apr. 6, 2018, the entire contents of which are incorporated herein by reference in their entirety.

BACKGROUND

Many conventional loudspeakers produce sound by inducing piston-like motion in a diaphragm. Panel audio loudspeakers, such as distributed mode loudspeakers (DMLs), in contrast, operate by inducing uniformly distributed vibration modes in a panel through an electro-acoustic actuator. Typically, the actuators are electromagnetic or piezoelectric actuators.

SUMMARY

In general, in one aspect, the disclosure features a device including an inner magnet arranged relative to an axis, an outer magnet arranged a radial distance from the axis, an inner radial wall of the outer magnet facing an outer radial wall of the inner magnet, the inner and outer radial walls being separated by an air gap, a voice coil arranged in the air gap separating the inner and outer magnets, and an actuator coupling plate attached to the voice coil. During operation of the device electrical activation of the voice coil causes axial motion of the actuator coupling plate.

Implementations of the device can include one or more of the following features. For example, the inner and outer magnets can be axially magnetized or radially magnetized. In some embodiments, the inner magnet is magnetized axially and the outer magnet is magnetized radially.

The inner and outer magnets can be symmetric with respect to axial rotations.

The device can include a soft magnetic material attached to the inner and outer magnets. For example, the device can include plates on opposing sides of the inner and outer magnets in the axial direction comprising the soft magnetic material. In some embodiments, the device includes a yoke composed of the soft magnetic material.

The device can have a maximum dimension in the axial direction of 10 mm or less (e.g., 8 mm or less, 5 mm or less, 4 mm or less, 3 mm or less).

In a further aspect, the disclosure features a panel audio loudspeaker, including the device and a panel mechanically attached to the actuator coupling plate. The panel can include a display panel (e.g., an OLED or LCD display panel). The panel can include a touch panel. The device can be configured to generate audio and/or haptic responses.

In a further aspect, the disclosure features a mobile device including the panel audio loudspeaker. The mobile device can be a mobile phone or a tablet computer. In some embodiments, the mobile device is a wearable device.

Among other advantages, embodiments feature electromagnetic actuators with compact form factors and high force output. For example, use of concentric axially magnetized magnets can allow for maximizing and balancing the flux density experienced at both the inner and outer faces of a magnetic air gap in an electromagnetic actuator, maximizing a total flux density present in the air gap and therefore maximizing the force output. Such configurations may be realized in relatively small form factors, such as actuators that may be incorporated into mobile devices.

Accordingly, embodiments may solve challenges associated with creating a panel audio loudspeaker (alternatively referred to as a distributed mode loudspeaker (DML)) within a limited physical space with sufficient force over a prescribed audio bandwidth capable of exciting vibrational modes within a diaphragm while still fitting within a sufficiently small package size.

Other advantages will be evident from the description, drawings, and claims.

BRIEF DESCRIPTION OF THE DRAWINGS

Like reference symbols in the various drawings indicate like elements.

DETAILED DESCRIPTION

The disclosure features actuators for panel audio loudspeakers, such as distributed mode loudspeakers (DMLs). Such loudspeakers can be integrated into a mobile device, such as a mobile phone. For example, referring to FIG. 1, a mobile device 100 includes a device chassis 102 and a touch panel display 104 including a flat panel display (e.g., an OLED or LCD display panel) that integrates a panel audio loudspeaker. Mobile device 100 interfaces with a user in a variety of ways, including by displaying images and receiving touch input via touch panel display 104. Typically, a mobile device has a depth of approximately 10 mm or less, a width of 60 mm to 80 mm (e.g., 68 mm to 72 mm), and a height of 100 mm to 160 mm (e.g., 138 mm to 144 mm).

Mobile device 100 also produces audio output. The audio output is generated using a panel audio loudspeaker that creates sound by causing the flat panel display to vibrate. The display panel is coupled to an actuator, such as a distributed mode actuator, or DMA. The actuator is a movable component arranged to provide a force to a panel, such as touch panel display 104, causing the panel to vibrate. The vibrating panel generates human-audible sound waves, e.g., in the range of 20 Hz to 20 kHz.

In addition to producing sound output, mobile device 100 can also produces haptic output using the actuator. For example, the haptic output can correspond to vibrations in the range of 180 Hz to 300 Hz.

Figure 1:
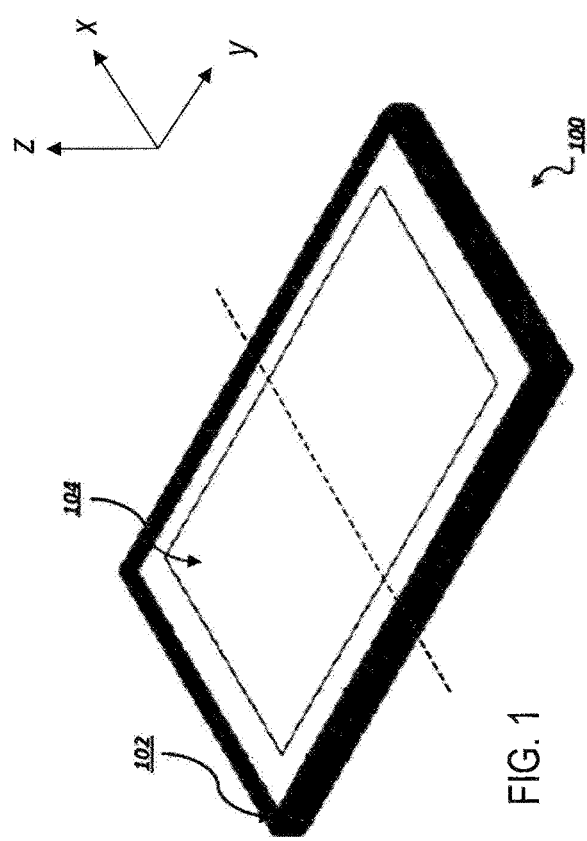
FIG. 1 is a perspective view of an embodiment of a mobile device.
Figure 2:
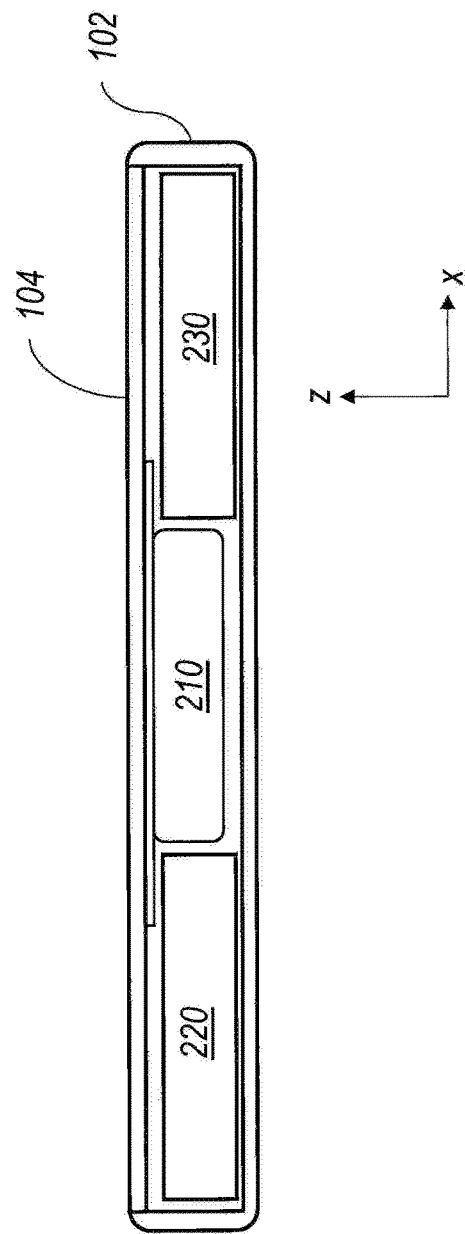
FIG. 2 is a schematic cross-sectional view of the mobile device of FIG. 1.

FIG. 1 also shows a dashed line that corresponds to the cross-sectional direction shown in FIG. 2. Referring to FIG. 2, a cross-section 200 of mobile device 100 illustrates device chassis 102 and touch panel display 104. FIG. 2 also includes a Cartesian coordinate system with X, Y, and Z axes, for ease of reference. Device chassis 102 has a depth measured along the Z-direction and a width measured along the X-direction. Device chassis 102 also has a back panel, which is formed by the portion of device chassis 102 that extends primarily in the X-Y-plane. Mobile device 100 includes an electromagnet actuator 210, which is housed behind display 104 in chassis 102 and affixed to the back side of display 104. Generally, electromagnet actuator 210 is sized to fit within a volume constrained by other components housed in the chassis, including an electronic control module 220 and a battery 230.

Figure 3A:
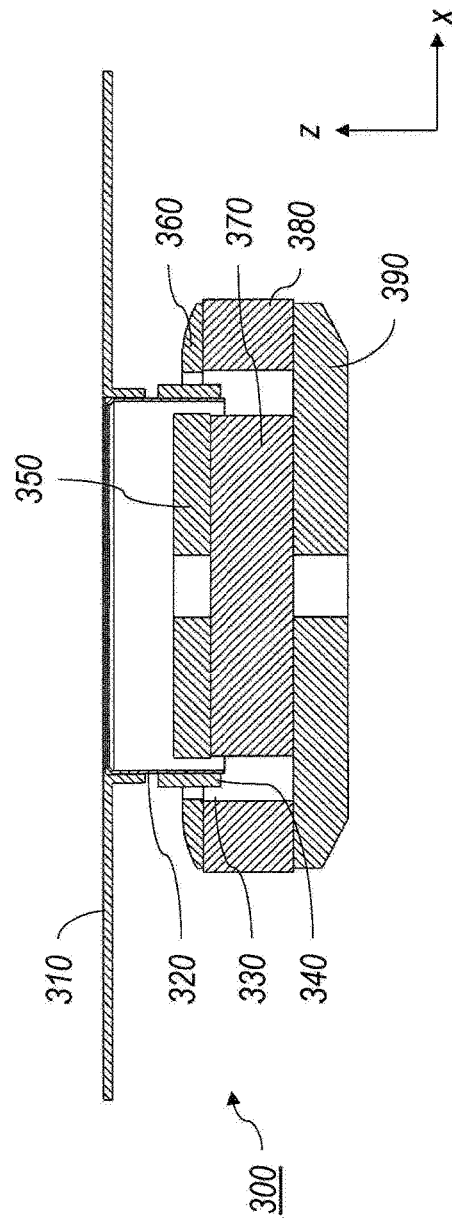
FIG. 3A is a cross-sectional view of an embodiment of a distributed mode loudspeaker (DML) axially magnetized circuit actuator.
Figure 3B:
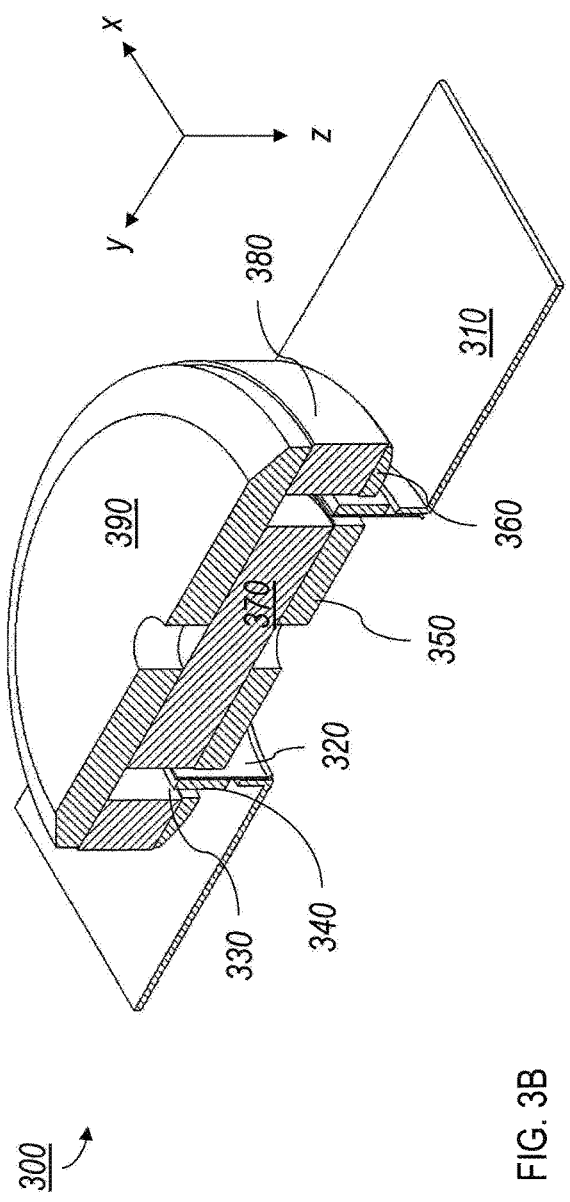
FIG. 3B is a sectional isometric view of the embodiment of the DML shown in FIG. 3A.
Figure 3C:
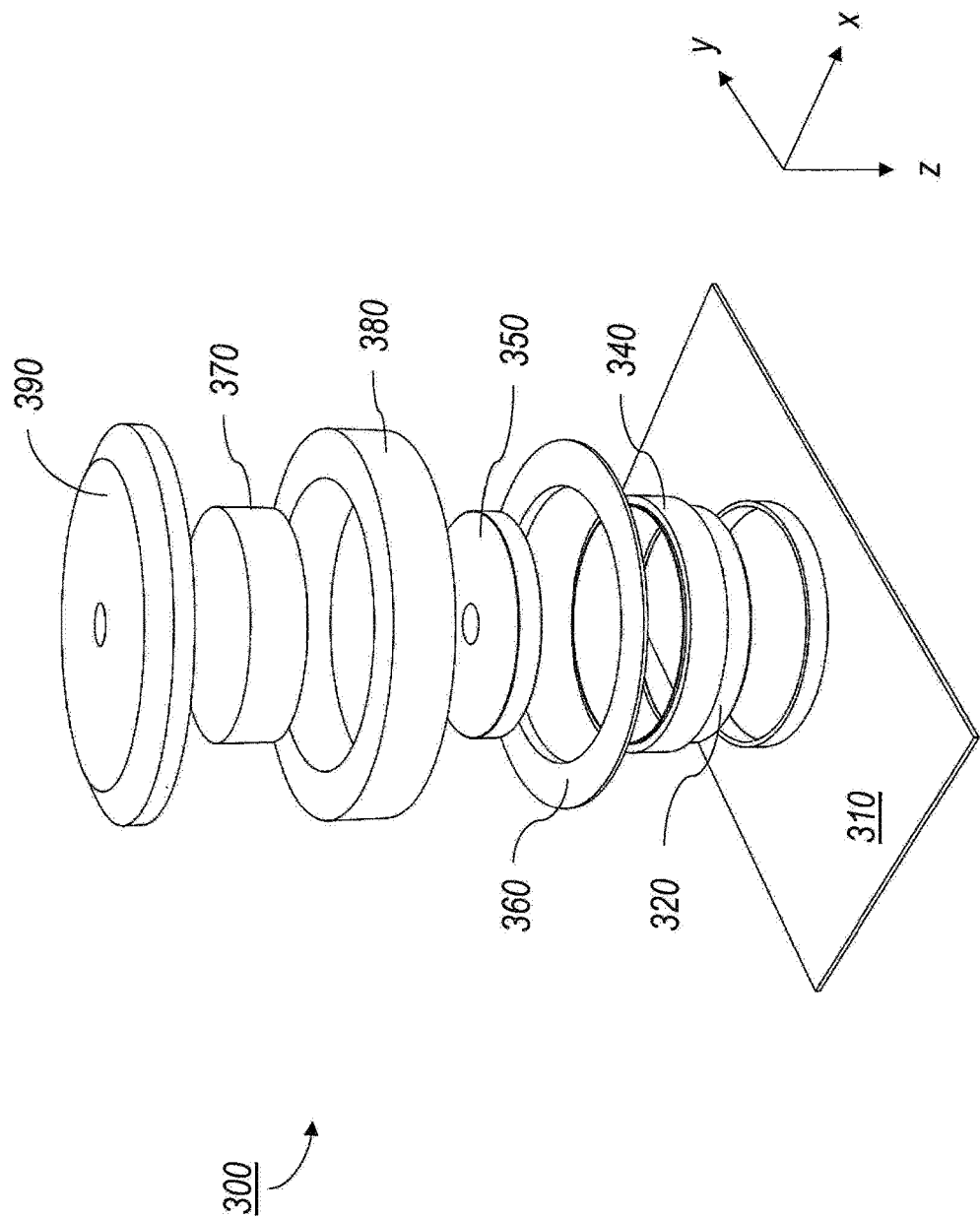
FIG. 3C is an exploded isometric view of the embodiment of the DML shown in FIG. 3A.

Referring to FIGS. 3A-3C, an embodiment of an electromagnet actuator 300 is shown in a cross-sectional, a sectional isometric, and an exploded isometric view, respectively. Actuator 300 includes a pair of axially magnetized magnets, specifically, an inner axially magnetized magnet 370 and an outer axially magnetized magnet 380, separated by an air gap 330. An axially magnetized magnet is one for which the magnetic flux lines at the magnet's surface are aligned parallel to the z-axis for the co-ordinate system shown in FIGS. 3A-3C. In other words, the magnet's poles are oriented along the z-axis. Inner and outer magnets 370 and 380 are arranged with their magnetic poles in opposite directions. In other words, if magnet 370 has its north pole facing in the +z direction, then magnet 380 has its north pole facing in the −z direction.

In general, the magnets can be formed from a material than can be permanently magnetized, such as rare earth magnet materials. Exemplary materials include neodymium iron boron, samarium cobalt, barium ferrite, and strontium ferrite.

A voice-coil 320, including voice coil windings 340, is located in air gap 330 between inner and outer soft magnetic plates 350 and 360 connected, via an actuator coupling plate 310, to a diaphragm (e.g., display 104) to generate a constant force to the diaphragm in order to excite multiple vibrational modes of said diaphragm, e.g., to generate both acoustic output and haptic feedback. Voice-coil 320 is sited in air gap 330 and is mechanically connected to the diaphragm to impart the force created by the actuator to the diaphragm. Specifically, an AC signal to voice-coil windings 340 present with an axial magnetic field from the coil which generates a force on actuator 300 to displace it back and forth in the axial (i.e., z) direction.

Soft magnetic plates (inner top plate 350, outer top plate 360, and back plate 390) sandwich axially magnetized magnets 370 and 380. Soft magnetic plates 350, 360 and 390 can be formed from a material or materials that are readily magnetized in the presence of an external magnetic field. Typically, such materials have high magnetic permeability. Examples include high carbon steel and vanadium permendur. Accordingly, soft magnetic plates 350, 360 and 390 serve to guide the magnetic flux lines from axially magnetized magnets 370 and 380 across air gap 330.

Actuator coupling plate 310 is coupled to the magnet assembly composed of magnets 350 and 360, top plates 350 and 360, and back plate 390 by one or more suspension element (not shown) that may take various geometric forms to provide a desired stiffness in order to tune the fundamental resonance (Fo) of the actuator to a desired frequency. The material used for this suspension may be a polymer, metal or hybrid material.

The use of concentric axially magnetized magnets can provide increased magnetic field flux and/or increased uniformity in magnetic flux density across the entire air gap compared with actuators that simply feature a single magnet circuit topology. Accordingly, actuators with concentric axial magnets can provide increased force output compared to other designs.

The actuator shown in FIGS. 3A-3C can be compact. For example, the thickness of the actuator in the axial direction can be on the order of a few mm, e.g., 5 mm or less, 4 mm or less, 3 mm or less, 2 mm or less. The lateral dimensions can also be relatively small. For example, the outer axially magnetized magnet can have a lateral diameter (i.e., the diameter orthogonal to the symmetry axis) of 20 mm or less (e.g., 15 mm or less, 12 mm or less, 10 mm or less, 8 mm or less, 7 mm or less, 6 mm or less, 5 mm or less). In implementations where actuator 300 is for use in a mobile device, such as mobile phone 100, the actuator can be sized and shaped to fit within the available space in the device chassis along with other components of the device.

Figure 4:
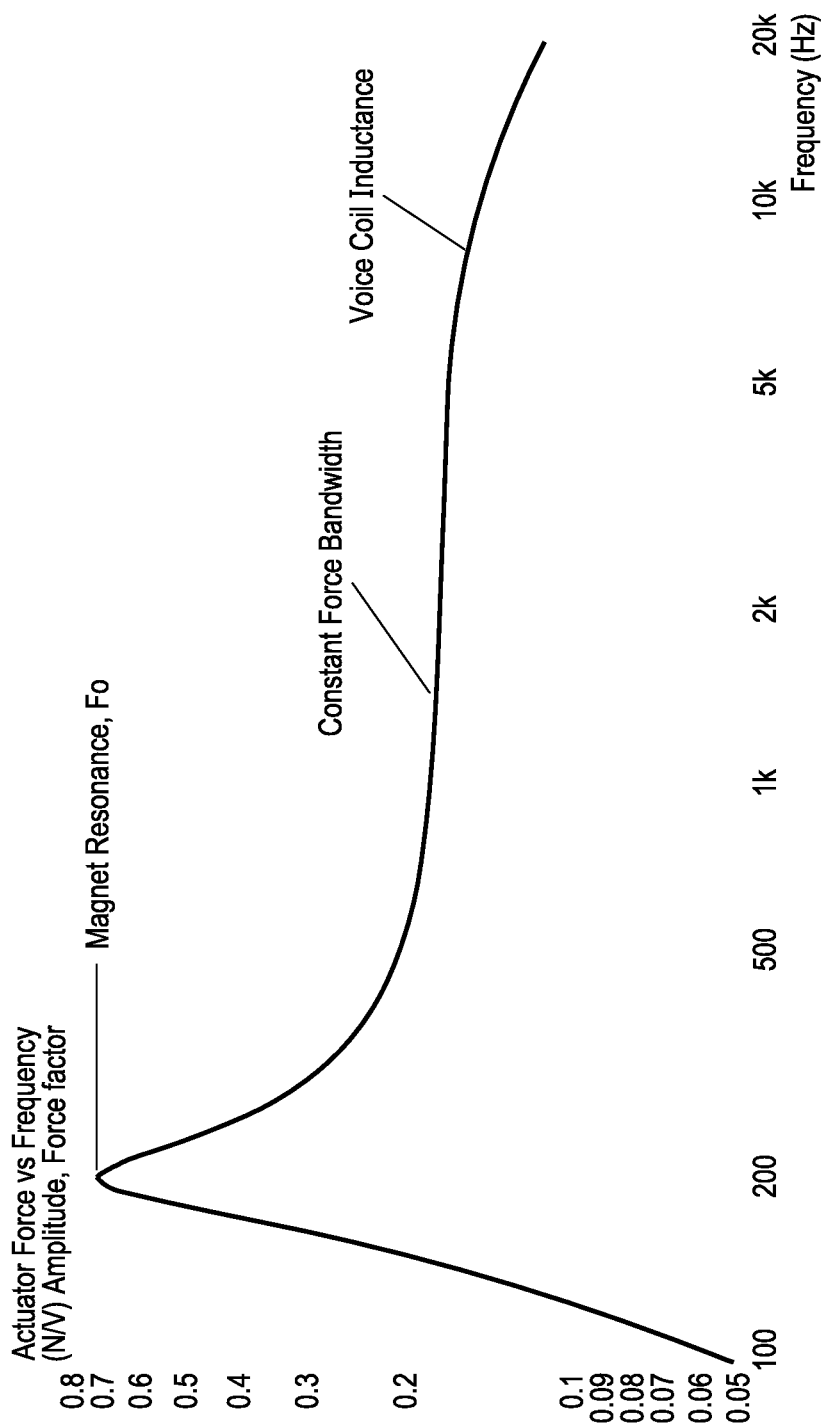
FIG. 4 is a plot showing a characteristic actuator force as a function of frequency.

An exemplary force vs. frequency characteristic for actuator 300 is shown in the plot in FIG. 4. Here, the vertical axis shows a magnitude of force, while the horizontal axis shows frequency from 100 Hz to 20 kHz. Both axes are shown with logarithmic scales. The actuator force peaks at a resonance frequency, FO, in this case at about 200 Hz. At higher frequencies, e.g., 500 Hz to 5 kHz in the example shown, the force v. frequency response is relatively constant. At higher frequencies (e.g., 10 kHz to 20 kHz), the force factor monotonically decreases as the voice coil inductance increasingly influences the response.

Actuators, such as actuator 300, may be designed to specify the actuator/diaphragm fundamental resonance frequency at such a bandwidth optimized to provide haptic feedback and a constant force bandwidth.

Figure 5:
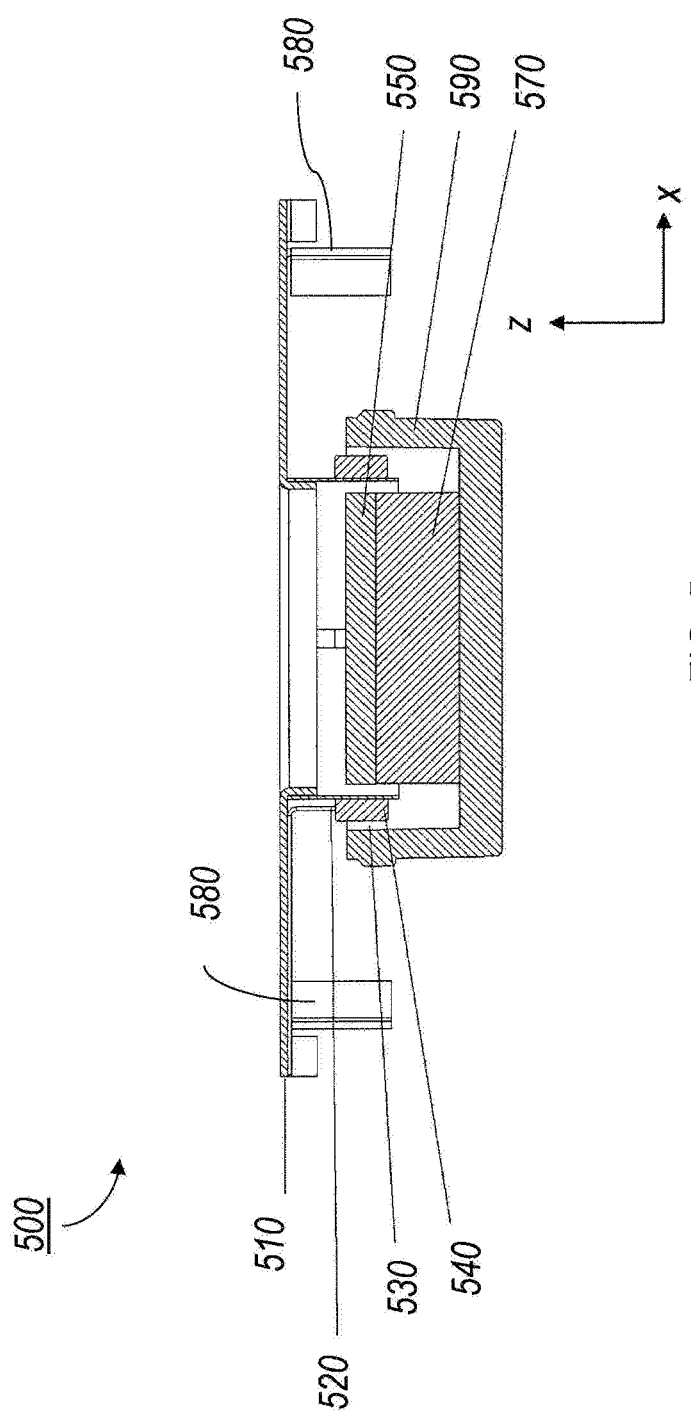
FIG. 5 is a cross-sectional view of another embodiment of a DML circuit actuator.

FIG. 5 shows another panel audio loudspeaker magnet actuator 500 that does not feature a pair of axially magnetized magnets. Rather, actuator 500 includes a single axially-magnetized magnet 570, which sits within a soft magnetic cup 590. Actuator 500 also includes a voice coil 520 with voice coil windings 540 that are located in an air gap 530 between pole plate 550 and cup 590. Voice coil 520 is attached to a coupling plate 510. Coupling plate 510 includes posts 580 to which one or more suspension elements (not shown) are used to connect coupling plate 510 to cup 590. A top plate 550, formed from a soft magnetic material, is located on the top surface of magnet 570. Such systems may have performance limitations arising from the soft magnetic top plate 550 and cup 590 increasing inductance and electrical impedance with increasing frequency. This increase in electrical inductance can reduce the acoustic output at high frequency.

The temperature and electrical resistance of the voice coil conductor can also increase with increasing current which causes power compression and limits the maximum force generated by the actuator. It is therefore often desirable to maximize (or at least, increase) the efficiency of the force generated by the actuator.

When the package size of an actuator is limited, the use of a thin magnet disc is often used in conjunction with a ferrous cup and pole piece (such as illustrated in FIG. 5, in which actuator 500 features cup 590 and top plate 550). However, this topology is often limited in its force generation due to the reduced flux density experienced at the outer face of the air gap compared to the flux density experienced at the inner face of the air gap created by the pole piece. This reduces the total flux density present in the air gap which corresponds to a reduction in force output.

While the foregoing embodiments feature axially-magnetized magnets, in some embodiments, actuators can utilize radially magnetized magnets. In such actuators, the magnets are magnetized such that the magnetic field lines at the magnet's surface extend in a radial direction (i.e., parallel to the x-y plane) relative to the vertical z-axis of the actuator at the magnet surfaces.

Figure 6A:
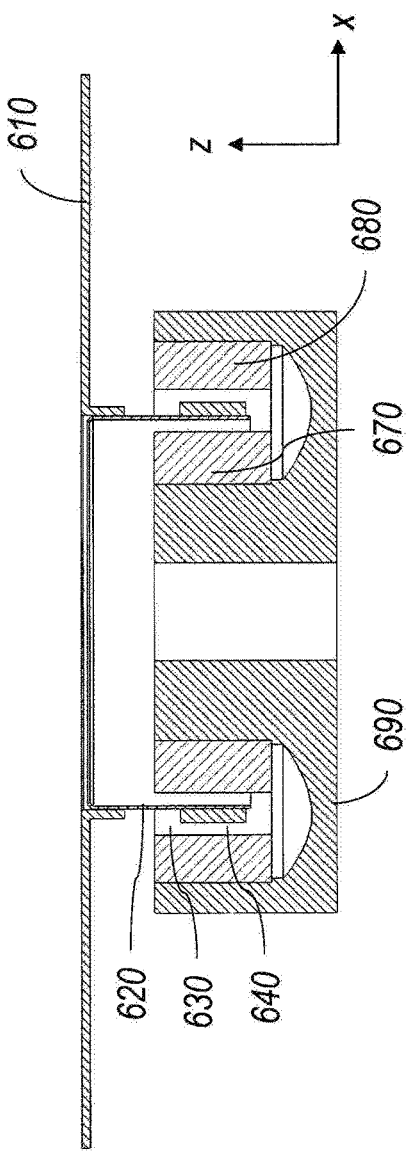
FIG. 6A is a cross-sectional view of an embodiment of a DML radially magnetized circuit actuator.
Figure 6B:
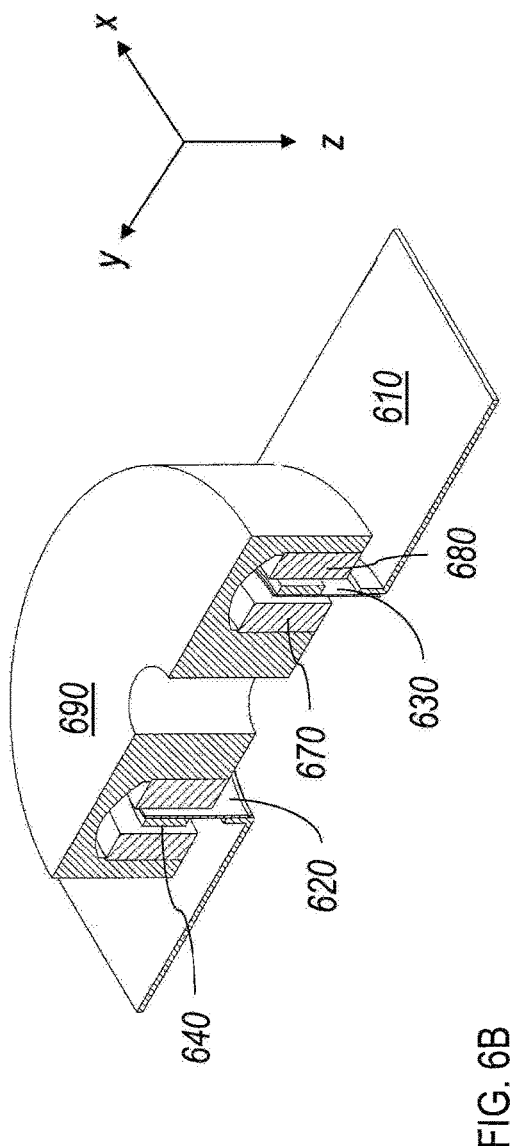
FIG. 6B is a sectional isometric view of the embodiment of the DML shown in FIG. 6A.
Figure 6C:
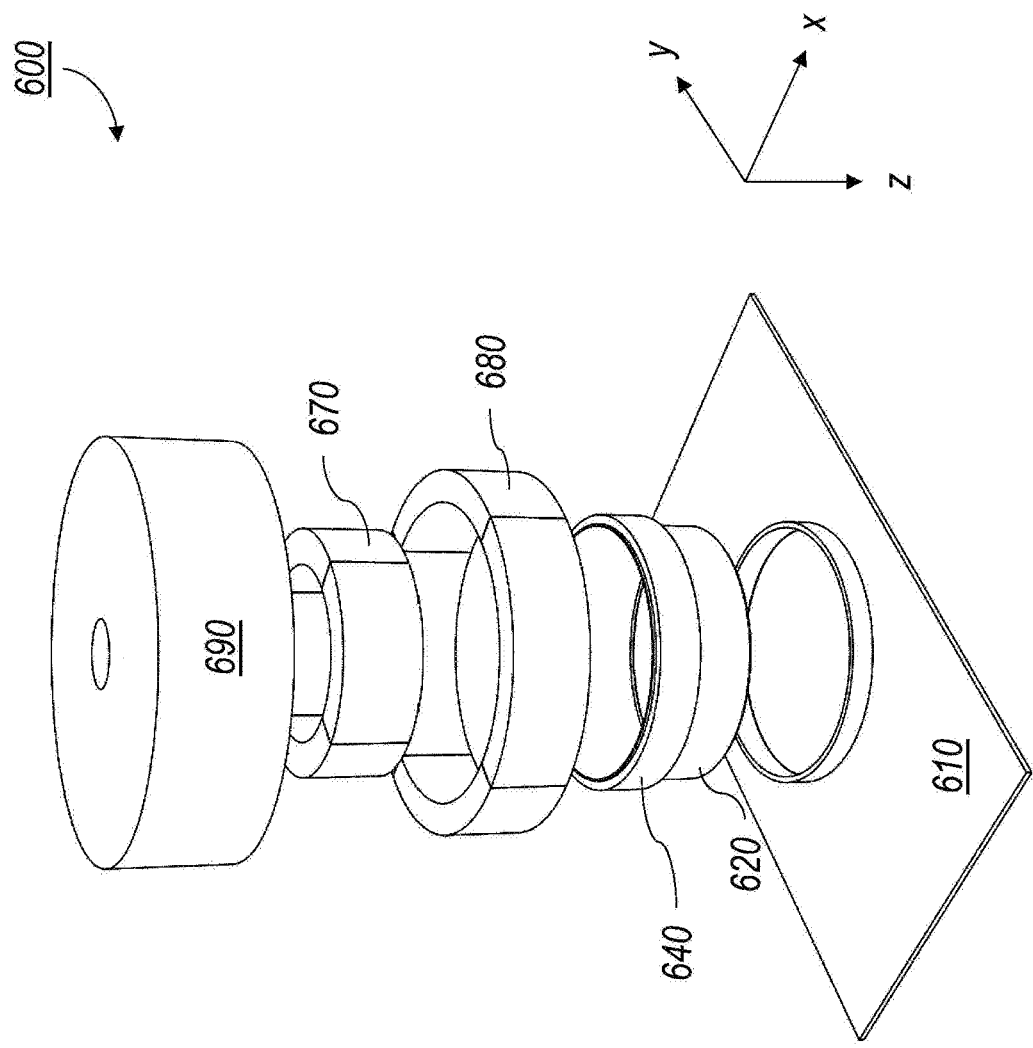
FIG. 6C is an exploded isometric view of the embodiment of the DML shown in FIG. 6A.

Referring to FIGS. 6A to 6C, an example of an actuator 600 with radially magnetized magnets is shown in cross-sectional, sectional isometric, and exploded isometric views, respectively. Actuator 600 includes an inner radially-magnetized magnet 670 and an outer radially-magnetized magnet 680 both centered on a vertical axis and separated by an air gap 630 in which voice coil windings 640 of a voice coil 620 are placed. In the current embodiment, a soft magnetic yoke 690 provides a frame to which magnets 670 and 680 are attached. An actuator coupling plate 610 (for attaching to a load, such as a flat panel display) is attached to voice coil 620. Actuator 600 can also include one or more suspension elements (not shown) connecting yoke 690 to coupling plate 610.

The use of a concentric, radially magnetized actuator (e.g., as shown in FIGS. 6A-6C) creates a relatively long magnetic air gap which may allow a comparatively smaller length voice coil windings to be situated within the magnetic air gap such that the magnetic field experienced by the voice coil and therefore the force generated would be linear and constant. The exclusion of soft magnetic material facing and over the length the air gap can reduce the electrical inductance and/or linearize the electrical inductance of the voice coil compared to an equivalent magnetic circuit that has soft magnetic material facing and over the length of the air gap. The use of concentric radial magnets can be used to maximize and balance the flux density experienced at both the inner and outer faces. Accordingly, such as design can increase (e.g., maximize) the total flux density present in the air gap and therefore increase (e.g., maximize) the force output.

In some embodiments, electromagnetic actuators combine an axially magnetized magnet within an annular radially magnetized wall. It is believed that such actuators are able to produce more power per physical size and mass than conventional actuators. This increased power is believed to be made possible by combining, for example, both a thin, flat axially magnetized neodymium magnet and a thin wall radially magnetized magnet(s).

Figure 7A:
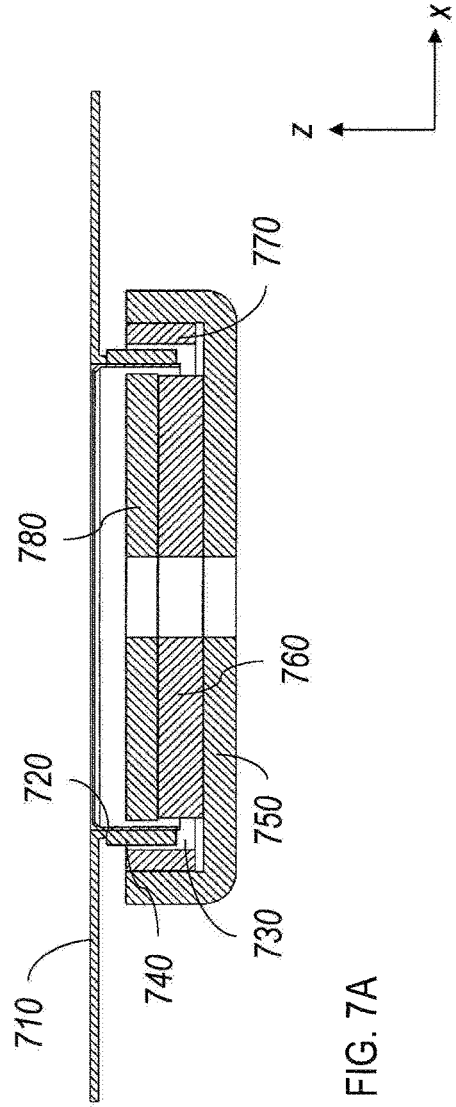
FIG. 7A is a cross-sectional view of an embodiment of a DML axially/radially magnetized circuit actuator.
Figure 7B:
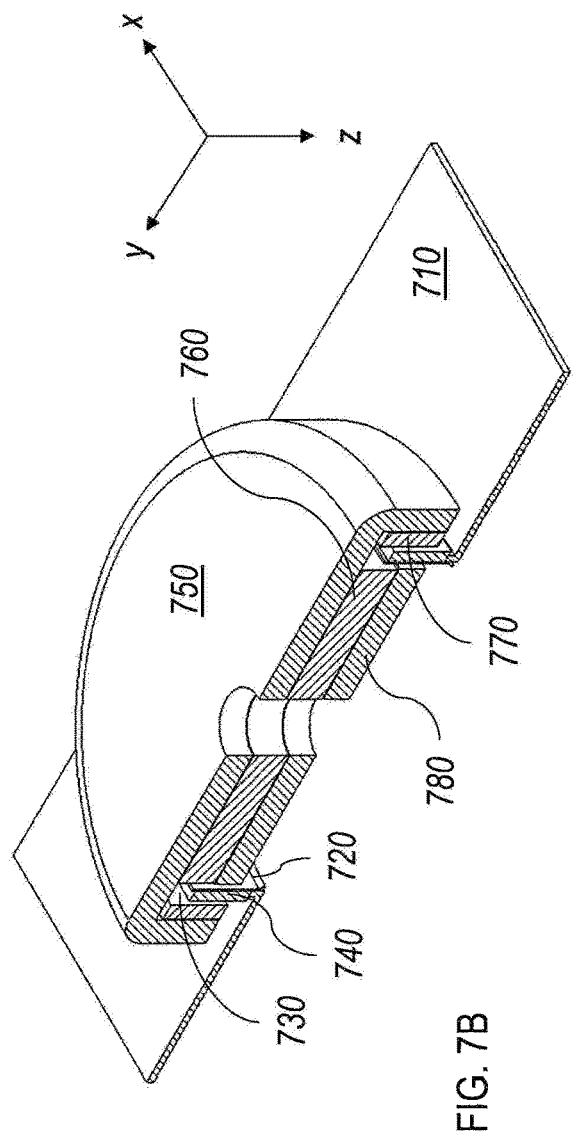
FIG. 7B is a sectional isometric view of the embodiment of the DML shown in FIG. 7A.
Figure 7C:
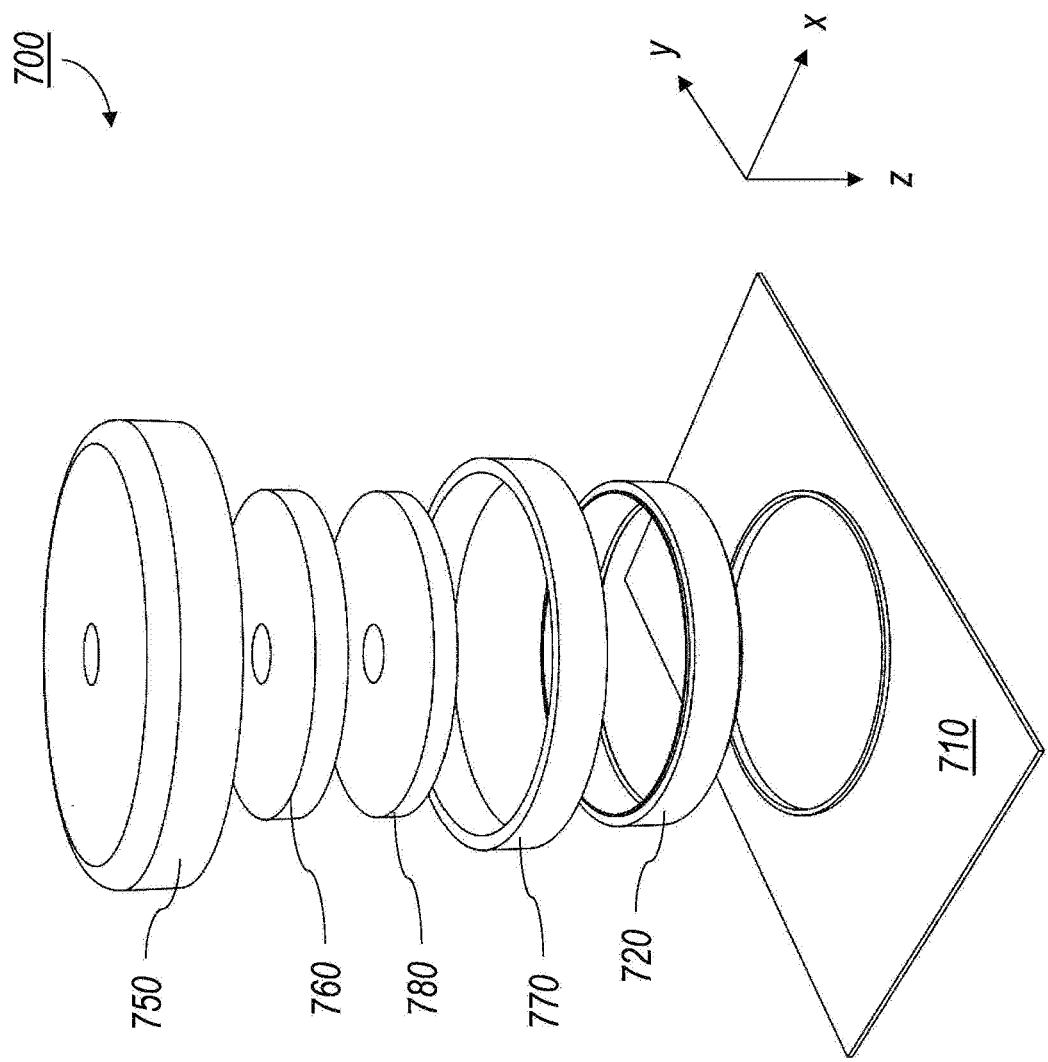
FIG. 7C is an exploded isometric view of the embodiment of the DML shown in FIG. 7A.

FIGS. 7A-7C depict an example of such an actuator in cross-sectional, sectional isometric, and exploded isometric views, respectively. Specifically, FIGS. 7A-7C show an actuator 700 that includes an axially magnetized disc magnet 760, a radially magnetized cylindrical magnet 770 and a voice-coil 720 located in a magnetic air gap 730 between the radial magnet 770 and top plate 780. Actuator 700 also includes a soft magnetic top plate 780 and a soft magnetic yoke 750. The soft magnetic top plate 780 and yoke 750 serve to guide the magnetic flux lines from the axially magnetized magnet 760 across air gap 730. Voice coil 720 is connected to an actuator coupling plate 710 to generate a constant force to a diaphragm attached to plate 710 in order to excite multiple vibrational modes of said diaphragm to generate both acoustic output and haptic feedback. Actuator 700 can also include one or more suspension elements (not shown) connecting yoke 750 to coupling plate 710.

The magnets can be formed from a material than can be permanently magnetized, such as rare earth magnet materials. Exemplary materials include neodymium iron boron, samarium cobalt, barium ferrite, and strontium ferrite.

The use of both an axially magnetized and radially magnetized magnets provides a way to increase (e.g., maximize) and balance the flux density experienced at both the inner and outer faces of the soft magnetic top plate and yoke maximizing the total flux density present in the air gap and to therefore optimize (e.g., maximize) the force output.

In some embodiments, radially magnetized magnet 770 can be realized by arc segments of a magnetic material constructed in such a way to create a continuous cylinder.

The use of a complementary radially magnetized magnet surrounding the outside of the voice coil and contained by a soft magnetic yoke contains the magnetic flux within the structure of the magnetic motor circuit minimizing leakage of magnetic flux from the magnetic circuit thereby minimizing interactance of the electromagnetic field with other sensitive components that may be in close proximity to the electromagnetic actuator. Additionally, the extended vertical length of the radially magnetized magnet provides a consistent field strength over the full length of the mechanical excursion capability of the voice coil.

Figure 8A:
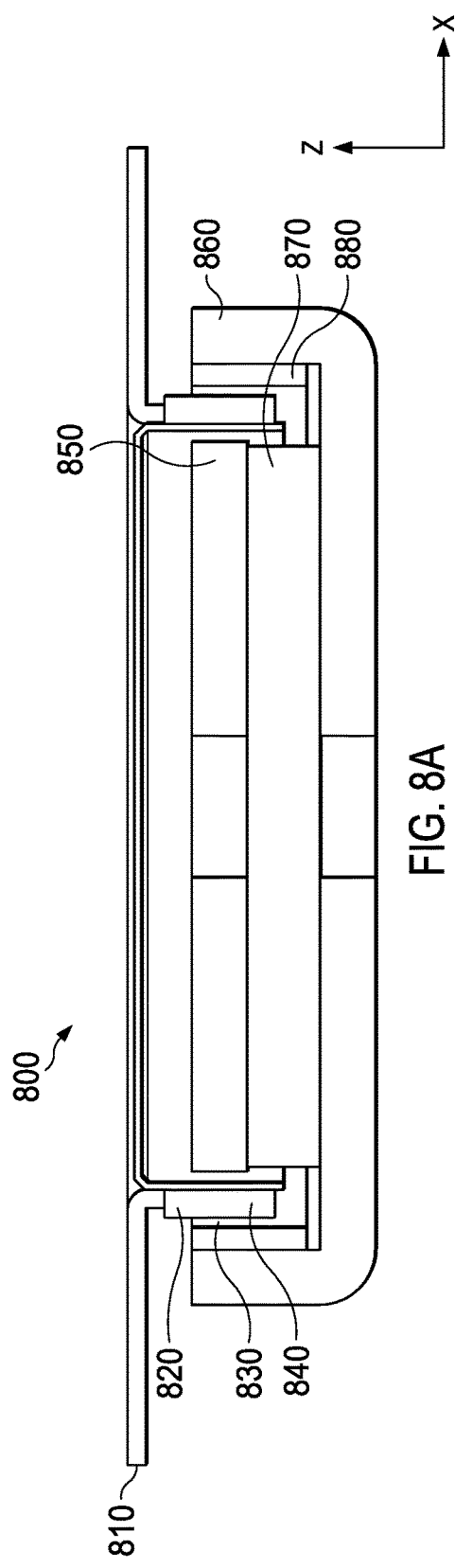
FIG. 8A is a cross-sectional view of a further embodiment of a DML circuit actuator.
Figure 8B:
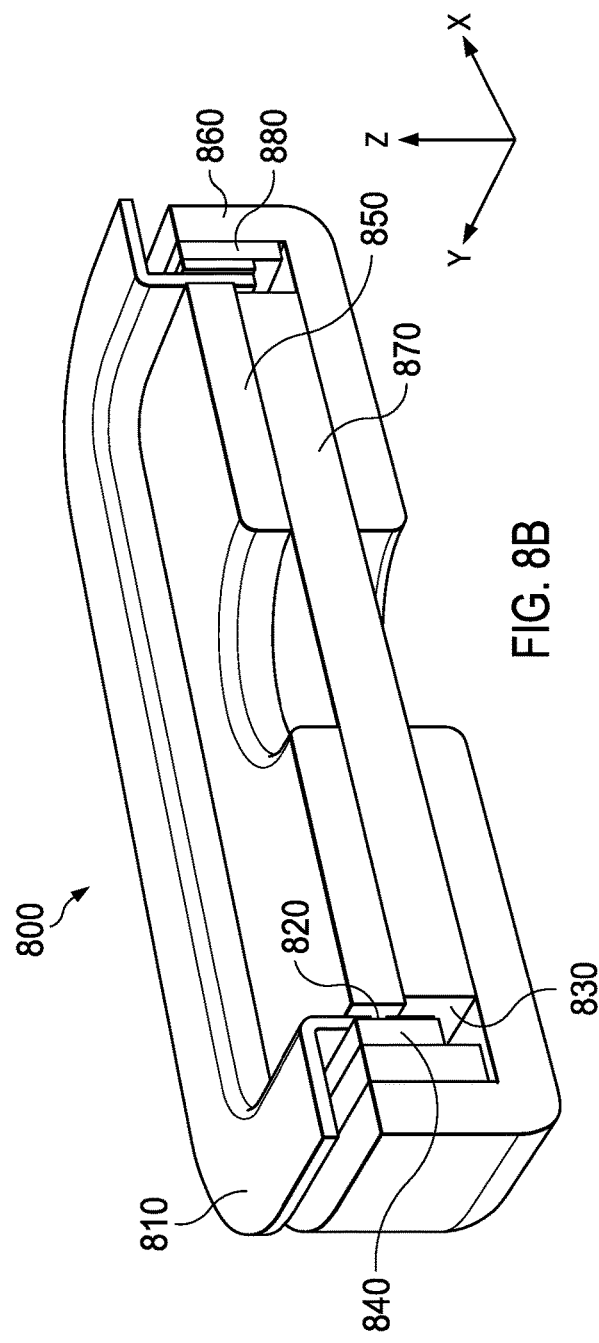
FIG. 8B is a sectional isometric view of the embodiment of the DML shown in FIG. 8A.

While the components of the actuators described above are axisymmetric (e.g., composed of continuously rotationally symmetric components, such as annular discs and the like), other implementations are also possible. For example, in some embodiments, the actuators can have elliptical or polygonal footprints. For example, a magnetic circuit topology within an elongated (e.g., oblong) package as shown in FIGS. 8A and 8B, which show a cross-sectional and a sectional isometric view of an actuator 800. Here, actuator 800 includes an inner axially magnetized magnet 870 shaped to be concentrically slightly smaller than a corresponding soft magnetic top plate 850 that is also shaped to be concentrically slightly smaller than a corresponding voice coil 820 with voice coil windings 840. A radially magnetized outer magnet 880 is separated from inner magnet 870 by an air gap 830, within which voice coil 820 sits. Outer magnet 880 can be constructed, for example, from linear magnetic blocks that would be situated along the outer, linear sides of the voice coil. Actuator 800 further includes a soft magnetic yoke 860 and a coupling plate 810, which is attached to voice coil 820.

Figure 9:
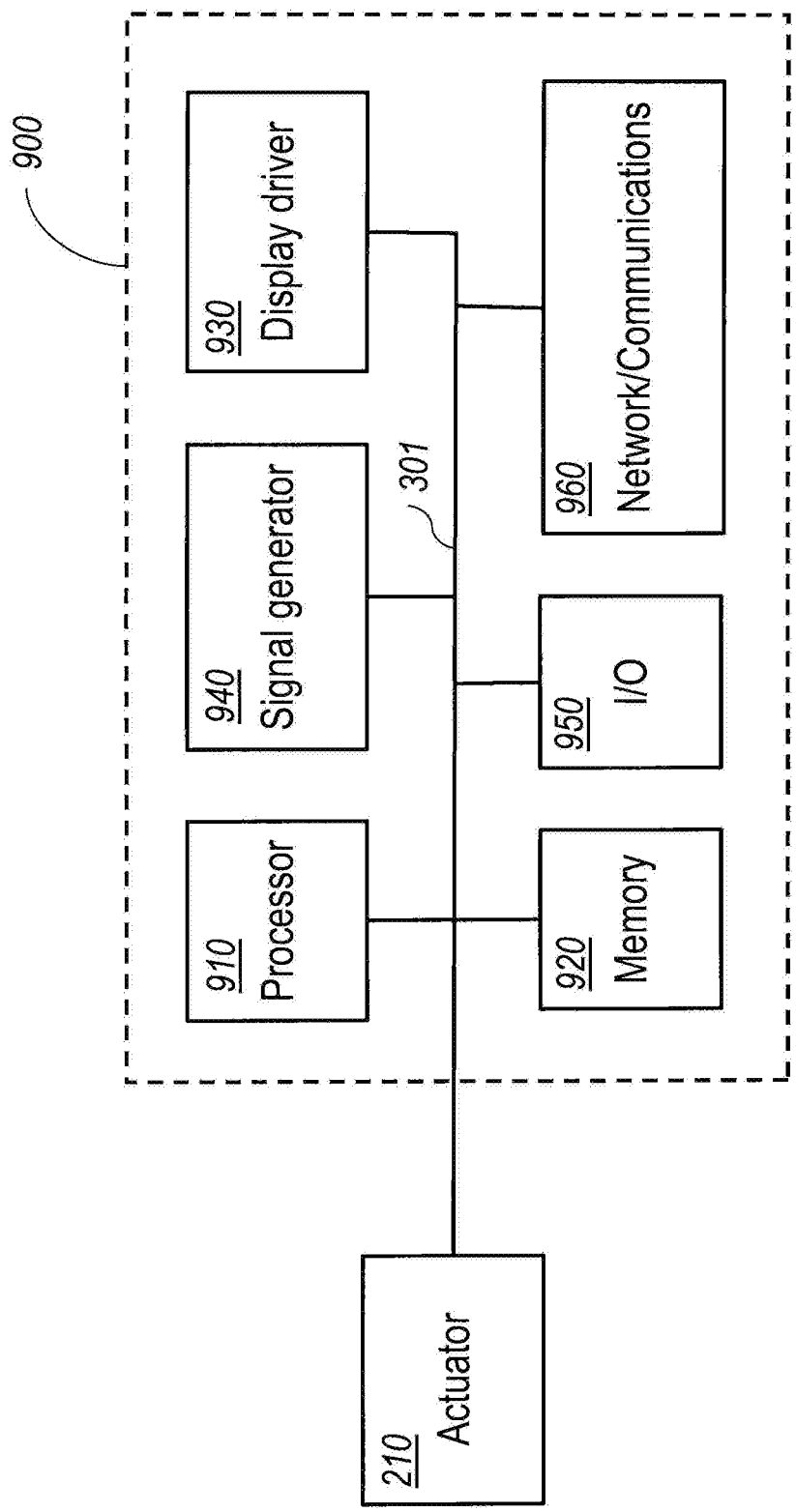
FIG. 9 is a schematic diagram of an embodiment of an electronic control module for a mobile device.

In general, the disclosed actuators are controlled by an electronic control module, e.g., electronic control module 220 in FIG. 2 above. In general, electronic control modules are composed of one or more electronic components that receive input from one or more sensors and/or signal receivers of the mobile phone, process the input, and generate and deliver signal waveforms that cause actuator 210 to provide a suitable haptic response. Referring to FIG. 9, an exemplary electronic control module 900 of a mobile device, such as mobile phone 100, includes a processor 910, memory 920, a display driver 930, a signal generator 940, an input/output (I/O) module 950, and a network/communications module 960. These components are in electrical communication with one another (e.g., via a signal bus) and with actuator 210.

Processor 910 may be implemented as any electronic device capable of processing, receiving, or transmitting data or instructions. For example, processor 910 can be a microprocessor, a central processing unit (CPU), an application-specific integrated circuit (ASIC), a digital signal processor (DSP), or combinations of such devices.

Memory 920 has various instructions, computer programs or other data stored thereon. The instructions or computer programs may be configured to perform one or more of the operations or functions described with respect to the mobile device. For example, the instructions may be configured to control or coordinate the operation of the device's display via display driver 930, waveform generator 940, one or more components of I/O module 950, one or more communication channels accessible via network/communications module 960, one or more sensors (e.g., biometric sensors, temperature sensors, accelerometers, optical sensors, barometric sensors, moisture sensors and so on), and/or actuator 210.

Signal generator 940 is configured to produce AC waveforms of varying amplitudes, frequency, and/or pulse profiles suitable for actuator 210 and producing acoustic and/or haptic responses via the actuator. Although depicted as a separate component, in some embodiments, signal generator 940 can be part of processor 910.

Memory 920 can store electronic data that can be used by the mobile device. For example, memory 920 can store electrical data or content such as, for example, audio and video files, documents and applications, device settings and user preferences, timing and control signals or data for the various modules, data structures or databases, and so on. Memory 920 may also store instructions for recreating the various types of waveforms that may be used by signal generator 940 to generate signals for actuator 210. Memory 920 may be any type of memory such as, for example, random access memory, read-only memory, Flash memory, removable memory, or other types of storage elements, or combinations of such devices.

As briefly discussed above, electronic control module 900 may include various input and output components represented in FIG. 9 as I/O module 950. Although the components of I/O module 950 are represented as a single item in FIG. 9, the mobile device may include a number of different input components, including buttons, microphones, switches, and dials for accepting user input. In some embodiments, the components of I/O module 950 may include one or more touch sensor and/or force sensors. For example, the mobile device's display may include one or more touch sensors and/or one or more force sensors that enable a user to provide input to the mobile device.

Each of the components of I/O module 950 may include specialized circuitry for generating signals or data. In some cases, the components may produce or provide feedback for application-specific input that corresponds to a prompt or user interface object presented on the display.

As noted above, network/communications module 960 includes one or more communication channels. These communication channels can include one or more wireless interfaces that provide communications between processor 910 and an external device or other electronic device. In general, the communication channels may be configured to transmit and receive data and/or signals that may be interpreted by instructions executed on processor 910. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 960 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the electronic device 100 to a mobile phone for output on that device and vice versa. Similarly, the network/communications module 960 may be configured to receive input provided on another device to control the mobile device. For example, an audible alert, visual notification, or haptic alert (or instructions therefor) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:

1. A mobile device, comprising:
   one or more processors;
   one or more storage devices;
   a display panel;
   a touch panel overlying the display panel;
   a rigid metal actuator coupling plate affixed to the display panel; and
   an actuator device affixed to the rigid metal actuator coupling plate and comprising:
      a metal cup defining a cavity and including:
         an inner magnet arranged relative to an axis of the actuator device;
         a voice coil arranged in an air gap separating the inner magnet from an inner wall of the metal cup; and
         wherein the metal cup is not directly connected to the rigid metal actuator coupling plate; and
      a magnetic plate co-axial with the inner magnet and proximate to the rigid metal actuator coupling plate; and
   wherein during operation of the mobile device electrical activation of the voice coil causes audio output through motion of the rigid metal actuator coupling plate and the display panel along the axis of the actuator device.

2. The mobile device of claim 1, wherein the mobile device is a mobile phone or a tablet computer.

3. The mobile device of claim 1, wherein the inner magnet is symmetric with respect to the axis of the actuator device.

4. The mobile device of claim 1, wherein the actuator device has a maximum dimension in a direction along the axis of the actuator device of 10 millimeters or less.

5. The mobile device of claim 4, wherein the mobile device is a mobile phone or a tablet computer.

6. The mobile device of claim 1, wherein the actuator device has a maximum dimension in a direction along the axis of the actuator device of 5 millimeters or less.

7. The mobile device of claim 6, wherein the mobile device is a mobile phone or a tablet computer.

8. The mobile device of claim 1, wherein the display panel is a touch panel display.

9. The mobile device of claim 1, wherein during operation of the mobile device electrical activation of the voice coil causes audio output through motion of the rigid metal actuator coupling plate and the display panel along the axis of the actuator device.

10. The mobile device of claim 9, wherein the mobile device is a mobile phone or a tablet computer.

11. The mobile device of claim 1, wherein the display panel is an organic light emitting diode (OLED) display panel.

12. The mobile device of claim 1, wherein the inner magnet is composed of a rare earth magnet material.

13. The mobile device of claim 1, wherein the metal cup has a generally cylindrical shape.

14. The mobile device of claim 1, wherein the inner magnet is magnetized parallel to the axis of the actuator device.

15. A mobile phone, comprising:
one or more processors;
one or more storage devices;
an organic light emitting diode (OLED) display panel;
a touch panel overlying the display panel;
an axisymmetric, rigid metal actuator coupling plate affixed to the OLED display panel; and
an actuator device affixed to the rigid metal actuator coupling plate and comprising:
  an axisymmetric metal cup defining a cavity and including:
    an inner magnet arranged relative to an axis of the actuator device, wherein the inner magnet is composed of a rare earth magnet material and is magnetized parallel to the axis of the actuator device;
    a voice coil at least partially located in an air gap separating the inner magnet from an inner wall of the metal cup; and
    wherein the metal cup is not directly connected to the rigid metal actuator coupling plate; and
  an axisymmetric magnetic plate co-axial with the inner magnet and proximate to the rigid metal actuator coupling plate;
  wherein the actuator device has a maximum dimension in a direction along the axis of the actuator device of 8 millimeters or less; and
wherein during operation of the mobile phone electrical activation of the voice coil causes audio output through motion of the rigid metal actuator coupling plate, the display panel, and the touch panel along the axis of the actuator device.

* * * * *